Patented Sept. 19, 1950

2,522,971

UNITED STATES PATENT OFFICE 2,522,971

METHOD OF BLEACHING BARYTES

Thane K. Stinson, Belleville, Ill., assignor, by mesne assignments, to C. K. William & Co., East St. Louis, Ill., a corporation of Delaware No Drawing. Continuation of application Serial No. 296,252, September 23, 1939. This application April 19, 1947, Serial No. 742,749

6 Claims. (Cl. 23—122)

The present invention relates to a process for treating a certain type of barytes to reduce the discoloration due for the most part to specific impurities and to render it suitable for use as a pigment or filler for paints, rubber, oilcloth and the like.

Barytes ore is a natural barium sulfate found in several different forms and each form contains one or more of a large variety of impurities. As set forth in the text "Mineralogy" by Phillips, page 528, barytes may be either associated with sedimentary rocks or with ore veins, among the latter being lead ore veins, zinc ore veins and veins containing sulfides. The nature of the impurities therefore depends upon the location or proximity with other minerals. Barytes found in the United States generally contains iron impurities in the form of oxides together with organic impurities and that found in certain localities contains in addition to the oxide also pyrite and galena, which impurities are difficultly removable and cause the barytes to possess an objectionable color. In Europe barytes is also found in numerous places and among the ores there is one containing varying amounts of fluorspar together with iron compounds and organic matter. (See U. S. patent to Ebers, No. 1,709,612.)

The present invention is directed to the treatment of that described type of barytes containing pyrite and galena, which is "fluorspar-free."

In order to remove the impurities the barytes is commonly treated by grinding the crude ore in a tube or ball mill to form a wet slurry of a fineness such that it will pass a 250 or 300 mesh screen and then it is bleached with hot sulfuric acid to remove those impurities which are soluble in acid. The treatment of the ore with the strong sulfuric acid converts the greater portion of the iron oxides present into sulfates of iron. The compounds formed will depend upon the state of the iron in the ore and the temperature and strength of the acid used in the treatment. They will depend also to some extent on the other impurities in the ore which may react with the compounds present during the treatment. The treatment sufficiently removes the staining impurities to provide a nearly white powder which is useful as a pigment and filler.

However, the impurities include pyrite (iron sulfide) which gives an undesirable gray tint to the product, galena (a lead sulfide) which also gives a gray tint and organic matter carried by the clay. The organic material when acted upon by hot sulfuric acid is converted into a black char.

Since galena and pyrite are both difficultly soluble in sulfuric acid solutions of the strength ordinarily used for bleaching barytes, they remain practically unchanged in the finished product when they are present in the raw ore. Finely ground galena when present in amounts as small as 0.01% gives a noticeable discoloration to acid treated barytes while 0.02% will discolor the product to such an extent as to prohibit its use in white paints and in other applications where a snow white filler is required.

The present invention provides an economical treatment to eliminate the discoloration caused by these last mentioned impurities, pyrite, galena and organic material, which is accomplished by an oxidation step.

According to the invention the fluorspar-free material containing the above impurities is treated with a strong oxidizing agent to oxidize the galena (lead sulfide) to a white lead sulfate and the pyrite (iron sulfide) to a readily soluble ferric sulfate which can be washed out by the sulfuric acid solution. The organic matter is oxidized and passes off as carbon monoxide and carbon dioxide.

In the preferred embodiment of the invention the fine ground barytes ore of the above described character is subjected to the action of a hot solution containing both a strong mineral acid, usually sulfuric, although hydrochloric, nitric or phosphoric acid may be used, and a strong oxidizing agent such as permanganates, chromates, soluble dichromates, nitrates, chlorates, perchlorates, peroxides and the like. It is one of the advantages of this embodiment that the oxidation and treating with mineral acid can be accomplished in one operation. This ordinarily is more economical and therefore preferable. It will be understood, however, that there are certain advantages when treating some ores in performing the two operations separately. The ore may be treated with the oxidizing agents first, and thereafter treated with the hot acid solution as a separate step.

When the oxidation step and the treatment with the acid solution, whether performed separately or together, have served their purposes, the oxidized metal salts of iron, chromium and the like which remain undissolved are reduced to salts having less objectionable color by treatment with a suitable reducing agent. The strong acid solution is then drawn off and the residual acid is washed out with water containing enough mineral acid to produce a pH more acid than 4. Washing is continued until the usual qualitative tests show no soluble iron in the wash water.

The purpose of using an acid wash water is to prevent the precipitation of iron as iron hydroxide in the wash water with consequent discoloration of the bleached barytes. The acidity should be sufficient to accomplish this object. An acidity of pH 4 is preferred in practice but this does not define a necessary limit.

The product obtained as the result of oxidizing and washing with acid to leach out the soluble impurities contains traces of compounds of objectionable color including, for example, yellow chromic salts present as the result of adding oxidizing agents. Some of these compounds are convertible by reducing agents to compounds of better color. Also certain relatively insoluble oxides of iron are converted to more soluble compounds. Accordingly the material is preferably treated with a reducing agent as, for example, sulfur dioxide gas and the color of the product improved. For example, the yellow chromic salts are converted to blue green chromous salts which, if of sufficient quantity, may impart a blue white tint to the material but this is preferable to the yellow tint. It is one of the advantages of the use of chromium compounds as oxidizing agents that the unavoidable residue can be thus converted.

The treatment with reducing agents can be most conveniently carried out by adding sulfur dioxide or another strong reducing agent to the strong acid solution and then boiling the product therein. If the acid solution has also contained an oxidizing agent, then obviously the reducing agent must be added in such quantity as to more than neutralize such oxidizing agent, that is to say, an excess of the reducing agent is added to the acid solution which already contains an oxidizing agent.

The product obtained by the process described is whiter than can be obtained from the same ore by any of the processes previously known.

To test the quality of the dried material it may be wet with gasoline or any liquid having nearly the same refractive index as the barytes or it may be formed into a paste or paint with any of the colorless oils usually used for pigment testing and viewed by both reflected and transmitted light.

*Example 1*

One thousands kgs. of barytes is ground to pass a 300 mesh screen. This barytes is then treated with 538 kgs. of sulfuric acid solution containing 125 kgs. of 66° Baumé sulfuric acid and 3 kgs. of sodium dichromate. The mass is heated to boiling in a suitable acid resisting container and maintained at such temperature for several hours, for example 4 to 14 hours. The time required will depend upon the content of the impurities of the original barytes treated, the fineness of the grind and other factors. When the oxidizing treatment has been continued until no further change in the color of the ground barytes results, then sulfur dioxide is led into the boiling acid solution at a slow rate until iron and chromium salts are completely reduced. The acid solution is then drawn off for reuse with another batch and the material is washed with water containing sufficient mineral acid to give a pH value more acid than 4. This washing may be either continuous or repeated and is continued until the wash water shows negative for water soluble iron or chromium salts by usual qualitative tests for these metals.

*Example 2*

One thousand kgs. of barytes is ground to pass a 300 mesh screen. This barytes is treated with 538 kgs. of hydrochloric acid solution containing 161.4 kgs. of 22° Baumé hydrochloric acid and 3 kgs. of sodium dichromate. The mass is then further treated as in Example 1.

The process of the present invention should not be confused with an earlier suggested process wherein fluorspar (considered to produce hydrofluoric acid) is employed along with sulfuric acid to break up or destroy and remove the impurities or wherein such reagents together with a small amount of niter are employed in conjunction with a roasting operation to improve the purification, particularly as to organic impurities.

The foregoing particular description is illustrative merely and is not intended as defining the limits of the invention.

This application is a continuation of application, Serial No. 296,252, filed September 23, 1939, now abandoned.

I claim:

1. The method of bleaching raw barytes which comprises subjecting the barytes ore to the action of a hot solution containing sulfuric acid and sodium dichromate for a period of several hours, removing the solution and treating the product with a reducing agent until yellow chromic salts are converted to blue green chromous salts.

2. The method of bleaching barytes containing as impurities pyrite, galena and organic matter which comprises oxidizing the pyrite to ferric sulfate, the galena to lead sulfate and the organic matter to carbon monoxide and carbon dioxide by heating the barytes in an aqueous acid solution of sodium dichromate and washing the material with mineral acid solution of a value less than about pH 4 and treating the material with a reducing agent subsequent to the oxidizing step until yellow chromic salts are converted to blue green chromous salts.

3. The method of bleaching barytes containing impurities such as pyrite, galena and organic matter which comprises subjecting the barytes to the action of a hot solution containing both dilute sulfuric acid and a strong oxidizing agent of the group consisting of permanganates, chromates, soluble dichromates, nitrates, chlorates, perchlorates, and peroxides for a period of several hours, and washing out the iron sulfates and oxidation products formed with water containing sufficient mineral acid to prevent precipitation of iron as iron hydroxide.

4. The method of bleaching barytes which comprises subjecting the barytes ore to the action of a hot solution containing both sulfuric acid and sodium dichromate for a period of several hours, adding an excess of a reducing agent to the acid solution and treating the barytes therewith until yellow chromic salts are converted to blue green chromous salts.

5. The method of bleaching barytes containing as impurities pyrite, galena, and organic matter which comprises contacting the barytes with a heated solution containing a strong oxidizing agent, containing chromium and a strong mineral acid in which the barytes is substantially insoluble until the pyrite present is converted to ferric sulfate, the galena to lead sulfate, the organic matter to carbon monoxide and carbon dioxide, the soluble impurities dissolved and an insoluble yellow chromic salt is formed, separating the solution from the solid barytes containing the chromic salt and treating the barytes with a reducing agent until the yellow chromic salt is converted to a blue green chromous salt.

6. The method of bleaching raw barytes containing as impurities pyrite, galena, and organic matter which comprises heating the barytes in an aqueous solution of sodium dichromate until the pyrite is oxidized to ferric sulfate, the galena to lead sulfate, and the organic matter to carbon monoxide and carbon dioxide, washing the product with mineral acid solution of a pH value of about 4, and treating the washed product with a reducing agent until yellow chromic salts are converted to blue green chromous salts.

THANE K. STINSON.

REFERENCES CITED

The following references are of record in the file of this patent:

UNITED STATES PATENTS

| Number | Name | Date |
|---|---|---|
| 514,040 | Schwahn | Feb. 6, 1894 |
| 1,452,315 | Scheuer | Apr. 17, 1923 |
| 1,663,159 | Ebers | Mar. 20, 1928 |
| 1,758,009 | O'Brien | May 13, 1930 |
| 1,783,778 | DeLore et al. | Dec. 2, 1930 |

OTHER REFERENCES

Phillips, "Mineralogy," 1912 edition, pages 528–530.